Aug. 16, 1966     P. DEH. EASTCOTT ETAL     3,266,376
HYDRAULIC REGULATING VALVE
Filed Jan. 13, 1965
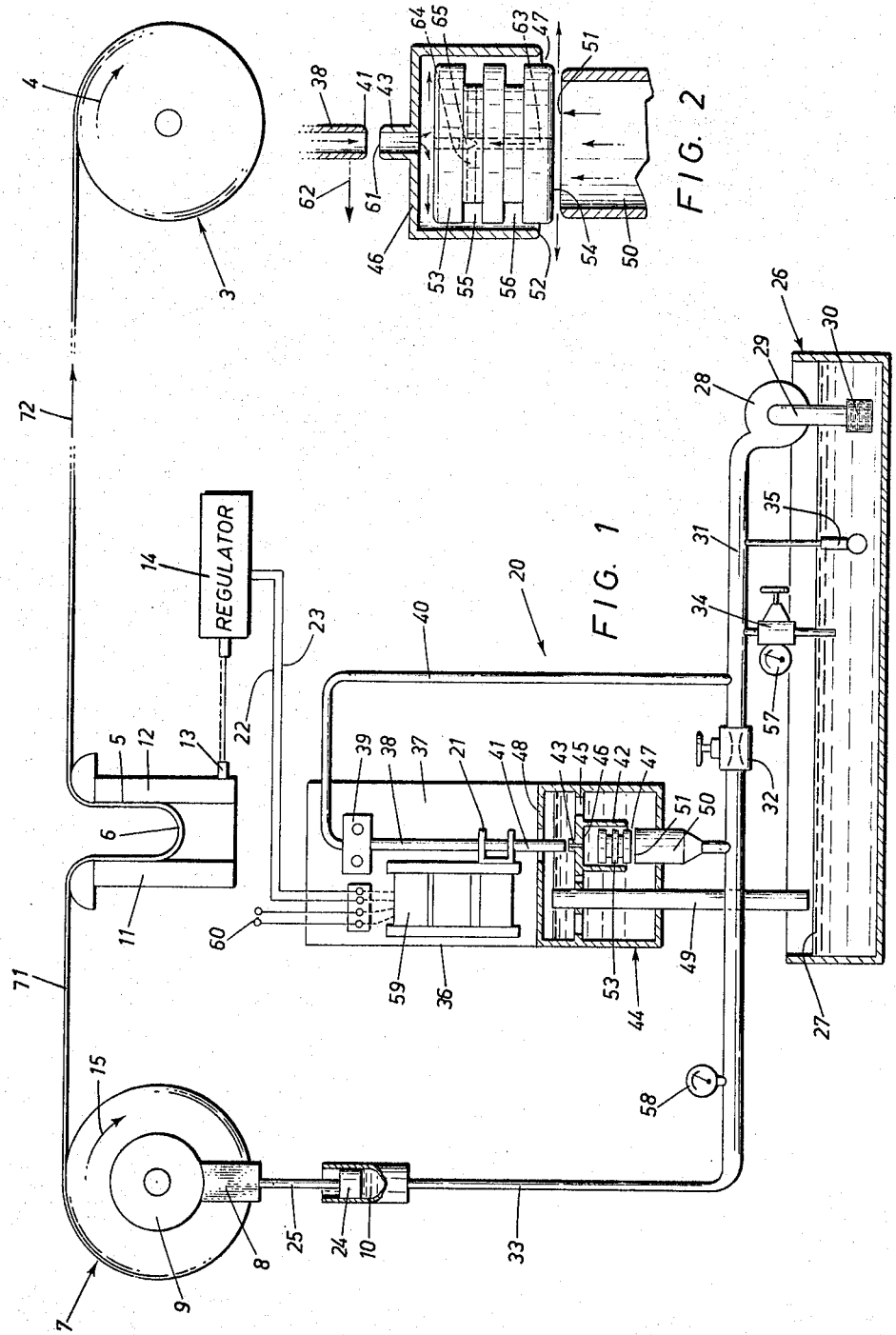
INVENTORS
PETER deH. EASTCOTT
JAMES R. SPIBEY
BY
John B. Sponsler

United States Patent Office 3,266,376
Patented August 16, 1966

3,266,376
HYDRAULIC REGULATING VALVE
Peter deH. Eastcott and James R. Spibey, Peterborough, Ontario, Canada, assignors to Canadian General Electric Company, Limited, Toronto, Ontario, Canada, a corporation of Canada
Filed Jan. 13, 1965, Ser. No. 425,137
9 Claims. (Cl. 91—47)

This invention relates to a hydraulic valve for regulating the pressure of the liquid supplied to a hydraulic actuator for operation thereof.

Hydraulic actuators, in particular hydraulic cylinders, are used extensively throughout industry for many purposes where relatively large forces must be developed. In the cases where these forces must be controlled, this is most readily done by controlling the pressure of the liquid supplied to the actuator either manually or automatically. Automatic control is often effected by applying a very small signal to the input side of regulating equipment capable of giving a relatively large output controlled by the small input. The equipment presently available for automatic control of hydraulic actuators tends to be more elaborate than necessary for some applications, and consequently more expensive than warranted for the application.

Therefore the object of this invention is to provide a hydraulic regulating valve which is simple in construction and yet fast in operation.

Briefly, the invention resides in a combination consisting of a source of hydraulic liquid under pressure, a small, high velocity jet of the liquid acting on one end of a floating piston of which the other end serves as a valve for relatively large orifice in a liquid flow line bypassing a hydraulic actuator. The piston assumes a position of equilibrium between two opposing forces, one applied by the jet and the other by the liquid in the large orifice. Variations in the force of the jet positions the piston over the orifice accordingly and renders the rate of flow of the liquid from the orifice proportional to the jet force acting on the piston. These variations in liquid flow from the orifice appear as pressure changes in the actuator because the orifice is in a flow line bypassing the actuator. The piston is free to reciprocate in a cylinder which has at one end thereof a wall containing a small tubular orifice through which liquid from the jet can enter the cylinder, and the jet issues from the one end of a small tube aligned axially with the orifice and having said one end near the orifice. This tube has its other end secured to a stationary base, and it is made of a spring-like material which will allow the free end of the tube from which the jet issues to be sprung to one side by a relatively small force so as to divert a portion of the jet away from the orifice, allowing the remaining portion only of the jet to exert pressure on the piston. Consequently, a small force representing a control signal can be applied to deflect the free end of the tube laterally and thereby control the hydraulic actuator through the position of the piston in relation to the large orifice.

While the specification concludes with claims particularly pointing out and distinctly claiming the subject matter regarded as the invention, it is believed the invention will better understood from the following description taken in connection with the accompanying drawings, in which:

FIGURE 1 is a diagram showing the hydraulic regulating valve in a web handling system for control thereof; and FIGURE 2 is an enlargement of a portion of FIGURE 1 showing some of the main elements of the valve in more detail.

In FIGURE 1, the hydraulic regulating valve 20 is shown in a web handling system for controlling the force applied by a brake shoe 8 to a brake drum 9 on a roll 7 of web material such as paper. The web 71 is drawn from roll 7 against the retarding force of the brake by means of a driven roll 3 onto which it is wound; arrow 72 indicates the direction the web travels and arrows 15 and 4 the direction rolls 7 and 3 rotate. Roll 3 may be driven by means of a motor coupled to the shaft supporting the roll. Both rolls are wound around a central core having a shaft which is supported for rotation in bearings secured to the frame of the equipment.

If web 71 is to lay in uniformly in roll 3, the tension applied to it while it is being rolled up must be maintained substantially constant. The remainder of the equipment shown in FIGURE 1 is for the purpose of tension control; it consists of a suction box 5 for drawing a loop 6 in the web, a radiant energy device 11, 12 for measuring the length of the loop in terms of an electrical signal, a regulator 14 for modifying the signal, and the hydraulic regulating valve 20 of the invention for utilizing the modified electrical signal to control the hydraulic actuator 10 which applies the braking force to roll 7 by way of shoe 8 and drum 9. The actuator illustrated is a simple hydraulic cylinder supplied with operating liquid from the regulating valve and having a reciprocating piston 24 connected to the brake shoe by means of a rod 25. Although not shown in the drawings, it is to be understood that the piston will usually act against some force producing means tending to release the brake, e.g., the weight of components 24, 25 and 8 when arranged vertically as illustrated in FIGURE 1.

Box 5 is a trough-like structure having a pair of parallel side walls, a bottom wall, a pair of end walls, and an outwardly curved surface along the upper edge of each side wall for leading the web into and out of the box. Suction at a substantially constant negative air pressure is applied inside the box below loop 6 for causing the loop to vary its length in response to irregularities in the release of web from roll 7 and in doing so, maintain the web tension substantially constant. The tension will remain very near consant because a substantially constant negative air pressure is applied to a substantially constant loop area. In maintaining the tension, the loop will lengthen if the rate at which the web is released from roll 7 increases and shorten if this rate decreases.

To prevent the loop from growing too long or too short, it is continually measured by the radiant energy device 11, 12. This device may consist of a column of light in an enclosure 11 directed through light transmitting windows in the side walls of box 5 into a light gathering box 12 on the other side of the suction box. Since loop 6 blocks light in proportion to its length, the light collected in box 12 will represent the length of the loop. Light sensitive means such as a number of solar cells connected in series are placed in box 5 so as to be exposed to the most representative of loop length. The electrical signal generated by the light falling on the cells is fed to regulator 14 via coaxial cable 13. Since the electrical signal from the solar cells represents distance, and that which it ultimately controls, i.e., braking, has the dimension of acceleration, the signal cannot be applied directly to the hydraulic regulating valve to control the brake if the performance of the closed regulating loop is to be stable, as it must be in this case. Consequently, the signal is modified in regulator 14 to render it suitable for stable operation of the regulating loop, then amplified in regulator 14, and finally passed through leads 22, 23 to the armature coil 21 in the hydraulic regulating valve. The current flowing in coil 21 causes the valve to exercise control over the brake actuator in such a way that the length of loop 6 remains within preset limits. In other words, coil 21 is linked with the control elements of valve 20 such that the degree of control exercised over valve operation depends on the value of the amplifier output. As loop 6 varies in length, a small signal representing such variations is first modified, then amplified, then finally applied to armature coil 21. Energization of coil 21 causes the valve to exercise control over the brake in such a way that the braking effort tends to restore the loop to its predetermined length. The speed at which the valve operates depends on the rate of change of the signal applied to coil 21 and this in turn depends on the rate at which the loop lengthens or shortens. For a more complete description of the web handling system illustrated in FIGURE 1 reference is made to the Eastcott and Spibey copending application Serial No. 425,325, filed January 13, 1965, and assigned to the same assignee as this application.

The hydraulic regulating valve will now be described. This valve is a relatively simple means for enlarging the signal from the amplified sufficiently to render it useful for actuating a hydraulic cylinder in the braking mechanism. Valve 20 converts the relatively small electrical output from the amplifier into a hydraulic force large enough to be applied directly to cylinder 10 wherein it acts on piston 24, causing the piston to exert thrust on brake shoe 8 via piston rod 25 in proportion to the hydraulic force.

In the hydraulic regulating equipment shown in FIGURE 1, a tank 26 contains a supply of hydraulic liquid 27. Since this equipment operates well with ordinary water, it will be described using water as the hydraulic liquid. A constant displacement pump 28 having its intake pipe 29 connected to a filter 30 submerged in the water and having its outlet pipe 31 connected to an adjustable flow restricting valve 32 pumps water from the tank to cylinder 10 by way of pipe 31, valve 32 and a pipe 33 connecting the valve to the piston. Hence, the pump pumps water from the tank directly to the cylinder, and the pressure of the water in the cylinder causes piston 24 to increase or decrease the braking effort according to the water pressure. For example, if the water pressure increases, the piston drives the brake shoe harder against the brake drum, and if the water pressure decreases, the piston relaxes the force of the brake shoe on the brake drum. The pressure of the water in pipe 31 is maintained relatively constant by means of relief valve 34 which is set to open at a definite pressure and allow water to return to the tank whenever the set pressure is exceeded. The regulating valve has been found to operate well at pressure around but not exceeding 50 p.s.i.g. in pipe 31. Valve 35 is a safety valve placed in parallel with valve 34 and set to open at a pressure a little above the operating pressure of valve 34. This second valve is placed across the pump to protect it from damage due to excess pressure in the event that valve 34 fails to open at its set pressure. Since a preferred pump is one employing a worm and rubber casing, extra protection is desirable to prevent overstretching the rubber casing by abnormal pump pressures. The flow of water from the pump to cylinder 10 can be restricted to a set rate by adjusting the orifice in valve 32. Variations in the water pressure in cylinder 10 as required for brake control are effected by means of the electro-hydraulic device indicated by numeral 36 and now to be described.

Referring again to FIGURE 1, a small bore tube 38 is secured at its upper end to base 37 of device 36 by means of a clamp 39 such that the tube projects vertically downward from a stationary support. A pipe 40 connected to the upper end of tube 38 and pipe 31 at a point between valves 32 and 34 conveys water under pressure from point 31 to tube 38; this water is then ejected in a small stream from the lower end 41 of tube 38 as a high velocity jet. Tube 38 may be a straight length of about 20 inches of small bore brass tubing hard and stiff enough that it has the properties of a spring. Whenever the lower end of the tube is deflected from the vertical attitude it normally assumes, it springs back to this normal position immediately the force causing deflection is removed. It is possible also to use a tube 38 having a relatively large bore by plugging the lower end 41 of the tube and forming a small orifice in the plug, e.g., drilling a small hole in the plug in axial alignment with the tube.

Located directly below the lower end 41 of tube 38 in axial alignment therewith is a relatively large cylinder 42 open at its lower end 47 and closed at its upper end by a wall 46 except for a small tubular portion 43 projecting upward from the end wall through a perforated horizontal wall 45. Preferably, tube 43 has an inside diameter about the same as that of tube 38, and when tube 38 is in its normal position the two tubes are aligned axially. Hence a fluid flow passage is provided from tube 38 into cylinder 42 through tube 43. Cylinder 42 is secured at its upper end wall to plate 45 such that the cylinder projects downwardly from the wall. Wall 45 is secured in a horizontal position inside a tank 44, and the tank is mounted on base 37. The tank has a cover 48 with a hole therein through which the lower end of tube 38 projects into the tank, the hole being large enough to not interfere with lateral movement of the end of the tube.

A large overflow pipe 49 placed nearly vertically has its lower end in tank 26 and its upper end in tank 44 spaced a little above the upper end of tube 43 and a little below cover 48. This pipe allows water to flow from tank 44 into tank 26, keeping the water in tank 44 at the level of the upper end of the pipe. An upright pipe 50 passing through the bottom wall of tank 44 connects the tank to pipe 33 so water can flow therefrom into the tank. This pipe is aligned axially with cylinder 42, and has an enlarged open mouth or orifice 51 at its upper end facing the open end of the cylinder with the orifice located a little below the lower edge 52 of the side wall of the cylinder as best shown in FIGURE 2. Orifice 51 has a smaller diameter than that of the inside of cylinder 42. Pipe 50 allows water to flow virtually unobstructed from pipe 33 into tank 44 except for the piston 53 now to be described.

Piston 53 and the components co-operating therewith are best illustrated in FIGURE 2. The piston is a cylindrical member made of a lightweight material such as a plastic, it fits loosely inside cylinder 42 and has a bottom surface 54 large enough to completely cover orifice 51. When the piston is seated on the orifice, it blocks the flow of water from the orifice, and when in other positions it restricts the flow according to the distance surface 54 is above the orifice. The piston is supported for reciprocation in the cylinder by a thin wall of water between the piston and the cylinder wall, that is, it floats in a vertical attitude inside an annulus of water between two stops, one of which is the upper cylindrical wall 46 and the other orifice 51. When the piston is in its uppermost position, it interferes very little with the flow of water from the orifice, but when in its lowermost position, it closes the orifice.

The control element for the hydraulic regulating valve is shown in FIGURES 1 and 2 as tube 38. This tube has its upper end fixed to base 37 such that the tube hangs in a normal position in axial alignment with tube 43, with its lower end 41 free to be deflected laterally from the normal position against the spring action of the tube. Armature coil 21 is linked mechanically with the lower end 41 of tube 38 such that when the coil is energized from the amplifier in regulator 14, it exerts a force on the tube urging the lower end thereof to one side according to the magnitude and sense of the signal. By misaligning tube 38 with respect to tube 43, it is possible to obtain large hydraulic forces in the brake cylinder 10 related to the magnitude of the electric signal from the amplifier. Coil 21 is the movable component of an electrodynamic device resembling a loudspeaker; the device has a field electromagnet 59 energized from a D.C. source through leads 60, and is supported on base 37.

The operation of the regulating valve will now be described with reference to FIGURES 1 and 2. The pump is started, but before it will build up the water pressure in the regulating system, valve 32 must be at least partly closed, otherwise the water pumped into pipe 31 simply flows out of orifice 50 and back into tank 26 through overflow pipe 49 because no downward pressure has been developed on the piston; the piston is not restricting the flow of water from the orifice to allow the pressure to build up in the system. It is impossible to develop downward thrust of the piston until the pressure in pipe 31 is high enough to cause a jet stream of water to issue from the lower end of tube 38. Once the pressure builds up in pipe 31, water will flow therefrom through pipe 40 and tube 38, and be ejected from the end 41 of the tube at high velocity. So long as tube 38 is aligned with tube 43, as it will be when the valve is placed in operation, the stream of water will be directed into cylinder 42 by way of tube 43, and the force of the high velocity stream on the upper surface of the piston will drive the piston down onto orifice 51, thereby blocking or severely restricting the orifice. Once the jet has been established, valve 32 can be opened a predetermined amount because the jet will now hold the piston far enough down that it at least partially closes the orifice. The amount valve 32 is opened will have been determined at the time that the regulating valve was initially calibrated. It must be closed enough to create sufficient back pressure to prevent the system from being shut down on the first regulating swing, e.g., 30 to 50 p.s.i.g. back pressure when the regulating valve is set for operation on the 50 p.s.i.g. mentioned earlier. Before the regulating valve is placed in operation, the maximum pressure on pipes 31 and 33 will be set by adjusting valve 34 to readings shown on gauges 57 and 58. The pressures selected will depend on the characteristics of the regulating valve and its control function. As stated earlier, for the particular system described above, a maximum pressure of 50 p.s.i.g. in pipe 31 gives good results.

So long as tube 38 is in its normal undeflected position, i.e., aligned with tube 43, the downward force on the piston is maximum, and, as a result, the water flow from orifice 51 is minimum. When coil 21 is energized, it pulls the lower end of tube 38 to one side as indicated by arrow 62 in FIGURE 2, thereby diverting part of the jet away from the entrance 61 to tube 43; consequently, only a portion of the stream now exerts pressure on the water in cylinder 42. Reducing the stream of water to the cylinder reduces the downward force on the piston proportionately, allowing the piston to rise in the cylinder to a new position where the force of the jet on the upper surface of the piston is equal to the force of the water from the orifice on the lower surface of the piston. In rising, the piston allows more water to escape from the orifice. The water from both the orifice and the jet flows into tank 44, and from there back into tank 26 by way of the overflow pipe 49. The amount tube 38 is deflected from alignment with tube 43 depends on the strength of the electric signal supplied to coil 21 the stronger the signal the greater the deflection, and the greater the deflection the more water from the jet there is diverted away from the entrance to tube 43. This diversion of the jet is reflected on the downward force exerted on the piston, and the downward force on the piston determines its position with respect to the orifice and, consequently, the rate of water flow from the orifice. Hence the rate of water flow is directly related to the degree of misalignment of tubes 38 and 43, or to the magnitude of the electric signal, that is, the greater the signal the greater the flow from the orifice. When the signal energy in coil 21 drops to zero, tube 38 immediately springs back into alignment with tube 43.

An examination of FIGURE 1 will show that because of the throttling action of valve 32 the water pressure in cylinder 10 acting on piston 24 will decrease as the flow through orifice 51 increases. When the orifice is completely blocked by the piston, the pressure in cylinder 10 is about equal to that in pipe 33, and when the orifice is wide open, there will be little or no pressure in the brake cylinder. In practice, the regulating valve operates between these two extremes such that a very small electric signal applied to coil 21 controls a large hydraulic pressure in cylinder 10. This control is an inverse relationship wherein the pressure in cylinder 10 drops in response to an increase of signal energy. When no signal is applied to coil 21, the hydraulic pressure in cylinder 10 will be maximum and the thrust applied by piston 24 to brake shoe 8 will also be maximum; as the electric signal energy increases, the pressure in the cylinder decreases, relaxing the braking effort. A decrease in the electric signal energy increases the braking effort. Hence the regulating valve serves as a simple and fast means for using a relatively small electric signal to control a relatively large braking mechanism.

Referring again to FIGURE 2, the small arrows indicate directions of water flow. At least a portion of the jet issuing from tube 38 is directed into tube 43, while the remainder is diverted to one side of tube 43, the splitting of the jet depending on the degree of misalignment of the tubes. The entrance 61 to tube 43 may have a sharp edge as shown so the split in the jet will be clean, thereby minimizing the loss of jet energy due to turbulence and splashing from the high velocity water striking the edge of the tube. Some of the water entering cylinder 42 through tube 43 is forced down between the cylinder wall and the piston and expelled at the lower edge 52 of the cylinder. Since considerable clearance is provided between the cylindrical wall and the piston, a significant volume of water will flow through this annular space, forming a thin wall of water supporting the piston without frictional interference from the wall of the cylinder. In a sense the piston floats inside this wall of water.

The circumferential grooves 55 and 56 in the piston create flow turbulence and redistribute lateral fluid pressures around the cylinder such that the amount of water from the jet leaking past the piston is substantially less than the liberal piston clearance would otherwise permit.

Since the bore of cylinder 42 is made slightly larger than orifice 51, the light plastic piston continually finds an equilibrium position where the liquid pressure on its lower surface 54 is a small fixed percentage greater than the pressure exerted on its upper surface by the jet entering tube 43. In other words, when the piston comes to rest, the average hydraulic pressure on its upper and lower surfaces respectively will be the inverse of the internal diameters of parts 42 and 50. Since the average pressure on the lower surface of the piston is a little greater than the pressure on its upper surface, the piston provides pressure amplification greater than unity. The internal diameters of parts 42 and 50 may be varied over wide limits, but in the equipment described the ratio has been selected to approximately cancel out losses in the jet due to friction so the 50 p.s.i., feeding the jet will produce 50 p.s.i., in tube 50.

A further refinement to the volume amplifier shown in FIG. 2 consists of a small bore 63 axially through the piston communicating with a diametrical bore 64 terminating in groove 55. A pointed screw 65 threaded into the upper end of bore 63 prevents the direct passage of water from orifice 51 to the top of the piston, and restricts the flow of water from the superior pressure on the lower side of the piston to groove 55. As the flow of water to groove 55 is increased by backing out screw 65, a point is reached where substantially all the water leaking past the piston at 47 is supplied through bores 63 and 64 from the large volume of water rising up tube 50. In other words, the jet no longer supplies the water leaking past the piston. If screw 65 is backed off far enough, the superior pressure below the piston will actualy force water into cylinder 42 above the piston;

consequently, more water will be expelled from tube 43 than enters it from the jet. Eventually, a screw setting will be reached where the valve becomes snap acting and will keep orifice 51 closed regardless of the position of the jet. Those familiar with regulator design will recognize this feature as a simple and reliable means for introducing an adjustable amount of positive feedback into a regulating system. Hence, a small jet of water can be made to control a large piston. When the working liquid acts as the seal between the piston and the cylinder, as it does in this case, no piston rings are required. Eliminating the rings avoids the disadvantages associated therewith, e.g., friction, hysteresis and maintenance.

An alternative method of introducing positive feedback is to feed liquid directly from orifice 51 to the upper surface of the piston. This can be done by eliminating the diametrical bore 64 and screw 65 to allow the liquid in tube 50 to flow through bore 63 in the piston to its upper surface. Alternatively, bore 63 can be replaced with another bore not necessarily on the axis of the piston. Preferably, some means should be included for adjusting the flow through the axial bore, as for example, a set screw having a pointed end projecting into the axial bore from a threaded hole transverse to the axial bore. This arrangement, however, does not use the feedback stream to help center the piston in the cylinder.

In FIGURE 1 the means shown for deflecting tube 38 is an electromechanical device which converts an electrical signal into linear motion. Since the device simply converts an electrical control signal into mechanical movement of a tube, it may readily be replaced with a mechanical device which senses small movements and transfers them directly to the tube.

In the web handling system shown in FIGURE 1, the system will be set to hold the loop near a definite length, e.g., a loop extending half way into the box. At this particular loop length a certain amount of light will pass from the light source into the light gathering box where it will be converted into electrical signal energy which will cause a definite degree of misalignment of tubes 38 and 43. If the loop now lengthens, the light collected will decrease, causing the signal energy to decrease accordingly and bring tube 38 into closer alignment with tube 43. This drives piston 53 a little nearer orifice 51, thereby increasing the pressure in brake cylinder 10 and, consequently, the braking effort applied to roll 7. When the braking effort increases, the loop immediately shortens. As the loop shortens, the light collected increases, the signal energy increases, tube 38 moves farther away from alignment with tube 43, piston 53 rises, the pressure in brake cylinder 10 drops, and finally the brake relaxes its effort, allowing the loop to return to its normal length. The action of the regulating system is a rapid succession of corrective steps tending either to lengthen or shorten the loop so as to hold its length near said definite length without over correction. In summary, an increasing loop length increases the braking effort and vice versa.

The embodiments of the invention in which an exclusive property or privilege is claimed are defined as follows:

1. A hydraulic regulating valve comprising a relatively long, straight tube made of spring material; a fixed support; means for securing one end of said tube to said support such that the tube projects downward from the support with its axis vertical, said tube having a small orifice at its other end; a source of liquid under pressure connected to said one end of the tube and discharged, as a jet from said orifice; a cylinder located below said tube in axial alignment therewith, said cylinder being open at the bottom and having a top wall spaced a short distance from said orifice, another small orifice in said top wall in axial alignment with said orifice; a piston free to reciprocate in said cylinder; a hydraulic actuator; a supply of hydraulic liquid under pressure; a conduit connecting said supply to said actuator; a large by-pass orifice communicating with said conduit for diverting liquid away from said actuator, said by-pass orifice being located immediately below said piston in axial alignment therewith such that reciprocation of the piston regulates the flow of liquid from said by-pass orifice, said reciprocation being governed by liquid from the jet acting on the upper end of the piston after entering the cylinder through said other orifice; and means for deflecting said tube transverse to its axis in response to a control signal for diverting liquid of the jet away from said other orifice in proportion to the magnitude of the signal.

2. A hydraulic regulating valve comprising a relatively long tube made of spring material; a fixed support; means for securing one end of said tube to said support such that the tube projects freely from the support, said tube having a small orifice at its other end; means for maintaining hydraulic liquid under pressure; a conduit connecting said pressure means to said one end of the tube; a cylinder located adjacent the other end of said tube in closely spaced relation therewith; a piston supported to reciprocate in said cylinder; another small orifice in said cylinder at one end of said piston and aligned with said orifice; a hydraulic actuator; other means for maintaining hydraulic liquid under pressure; another conduit connecting said other pressure means to said actuator; a by-pass orifice communicating with said other conduit; means associated with said piston for varying the opening of said by-pass orifice by reciprocation of the piston; and means responsive to a control signal for deflecting said tube so as to misalign said small orifices.

3. A hydraulic regulating valve comprising a relatively long, straight tube made of spring material; a fixed support; means for securing one end of said tube to said support such that the tube projects downward from the support with the with its axis vertical, said tube having a small orifice at its other end; means for maintaining hydraulic liquid under pressure; a conduit connecting said pressure means to said one end of the tube; a cylinder located below said tube in axial alignment therewith, said cylinder being open at the bottom and having a top wall spaced a short distance from said orifice, another small orifice in said top wall in axial alignment with said orifice; a piston free to reciprocate in said cylinder; a hydraulic actuator; other means for maintaining hydraulic liquid under pressure; another conduit connecting said other pressure means to said actuator; a by-pass orifice communicating with said other conduit and located immediately below said piston in axial alignment therewith such that reciprocation of the piston regulates the flow of liquid from the by-pass orifice; and means responsive to a control signal for deflecting said tube so as to misalign said small orifices.

4. A hydraulic regulating valve comprising a relatively long, straight tube made of spring material; a fixed support; means for securing one end of said tube to said support such that the tube projects downward from the support with its axis vertical, said tube having a small orifice at its other end; a constant displacement hydraulic pump, a first conduit having one end thereof connected to the outlet of said pump; a flow restricting valve having its inlet connected to the other end of said first conduit for restricting the flow of liquid from the pump and thereby maintaining the liquid in the conduit under pressure; a second conduit connecting said first conduit to said one end of the tube; a cylinder located below said tube in axial alignment therewith, said cylinder being open at the bottom and having a top wall spaced a short distance from said orifice, another small orifice in said top wall in axial alignment with said orifice; a piston free to reciprocate in said cylinder; a hydraulic actuator; a third conduit connecting the outlet of said flow restricting valve to said actuator; a fourth conduit having one end connected to said third conduit; a by-pass orifice on the other end of said fourth conduit located immediately below said piston in axial alignment therewith such that reciprocation of the piston regulates the flow of liquid from the by-pass orifice; and means responsive to a control signal for deflecting said tube so as to misalign said small orifices.

5. The hydraulic regulating valve defined in claim 2, wherein said tube has a small bore constituting said orifice.

6. The hydraulic regulating valve defined in claim 2, wherein said means responsive to a control signal is an electromagnetic device having a stationary field structure and a movable armature coil secured to said tube near its other end.

7. The hydraulic regulating valve defined in claim 2, wherein said piston is a light weight member fitting so loosely in the cylinder that it floats on a thin wall of the liquid issuing from said tube into said cylinder.

8. The hydraulic regulating valve defined in claim 2, wherein said piston is a lightweight member fitting so loosely in the cylinder that it floats on a thin wall of liquid supplied at least in part from liquid in said by-pass orifice flowing through one or more small passages in said piston.

9. The hydraulic regulating valve defined in claim 2, wherein said piston contains at least one relatively small axial bore for conveying liquid from the orifice through the piston.

References Cited by the Examiner

UNITED STATES PATENTS 2,661,796   12/1953   Davies _____ 91—47

FOREIGN PATENTS 1,013,907   11/1953   Germany.

MARTIN P. SCHWADRON, *Primary Examiner.*

P. T. COBRIN, *Assistant Examiner.*